Patented Apr. 24, 1934

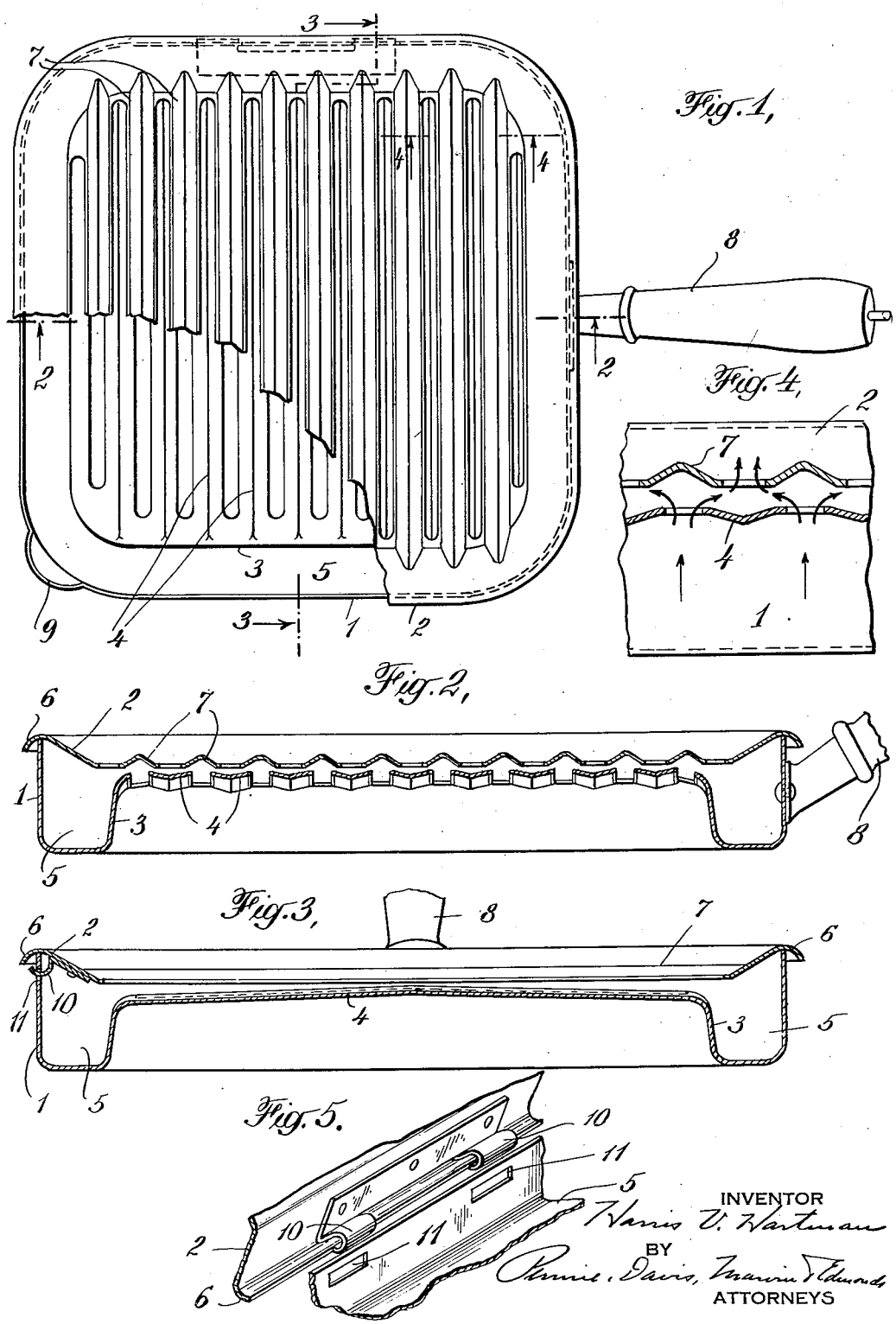

1,956,387

UNITED STATES PATENT OFFICE 1,956,387

BROILER

Harris V. Hartman, New York, N. Y.

Application August 11, 1933, Serial No. 684,619

3 Claims. (Cl. 53—5)

This invention relates to so-called "top-of-the-stove" broilers of the type in which the material to be broiled is supported on a grill member having a series of transversely extending parallel bars between which are slots or openings to allow the juices to run down into a pan. The pan has a series of parallel spaced bars located under the slots of the grill whose upper surfaces form grooves to catch the juices and conduct them to a trough extending around the outer edge portion of the pan. The heat from the stove passes upwardly through the spaces between the bars of the pan and the bars of the grill while the juices running down from the bars of the grill are caught by the grooves in the bars of the pan and conducted to the trough at the edge of the pan.

One of the objects of the invention is to provide a broiler of the above described type which is so inexpensive to manufacture that it may be marketed at a very low cost.

Another object of the invention is to provide means for ensuring that the bars of the grill will be held in proper position with respect to the bars of the pan and for holding the grill and pan firmly and securely together while the broiler is in use but which will allow quick and easy separation of the grill from the pan to facilitate cleaning.

One form of broiler embodying the invention is illustrated in the accompanying drawing in which Fig. 1 is a plan view of the broiler with a portion of the grill broken away to expose the underlying grooved bars of the pan;

Fig. 2 is a transverse section taken on the line 2—2 of Fig. 1;

Fig. 3 is a transverse section taken on the line 3—3 of Fig. 1;

Fig. 4 is an enlarged section of a portion of the broiler taken on the line 4—4 of Fig. 1; and Fig. 5 is a perspective view showing the details of the detachable connection between the grill and the pan.

The broiler shown in the drawing comprises a pan 1 adapted to support a grill 2. The center portion of the bottom of the pan 1 is bulged upwardly as indicated at 3 so that a portion of the bottom of the pan is raised to a higher level. This raised portion of the bottom of the pan is formed into a series of transversely extending spaced parallel bars 4 which are V-shaped in cross section so that their upper surfaces constitute grooves to catch the juices running down from the grill as hereinafter explained. The bulging in of the bottom of the pan serves two purposes, first, it elevates the bars 4 into close proximity with the grill and second, it results in the formation of a trough 5 extending around the outer edge portion of the pan. The bars 4 are higher at the center line of the pan than they are at their outer ends as shown in Fig. 3 so that the juices caught by the grooves in the bars will have a tendency to flow into the trough 5.

The grill portion 2 is so formed that it has a lip 6 at its outer edge which rests on the upper edge of the pan 1 when the broiler is in its assembled condition. The center portion of the grill has a series of transversely extending spaced bars 7 which are substantially parallel with the bars 4 of the pan and so arranged that the openings or slots between the bars 7 overlie the grooves in the bars 4. The shape of the bars 7 in cross section is preferably that of an inverted V.

The pan 1 is provided with a handle 8, the gripping portion of which is preferably made of some material which is a poor conductor of heat, such as wood. The pan is also provided with a spout 9 preferably located at one corner of the pan, when the pan is of rectangular shape, so that the juices collected in the trough 5 may be poured out of the pan.

The grill 2 is held in place on the pan 1 by interfitting or interlocking parts constituting a detachable hinge connection, preferably of the type shown in detail in Fig. 5. This connection may comprise a pair of lugs 10 on the grill bent to a semi-circular or hook shape as shown in the drawing, which are adapted to engage in a pair of openings 11 formed in one of the vertical walls of the pan near its upper edge. The portion of the pan immediately above each opening 11 constitutes a horizontal element of the hinge connection about whose axis the hinge operates. The lug 10 is a receiving portion for this element and together with the horizontal element normally holds the grill in position on the pan when the broiler is in use. When it is desired to attach the grill to the pan the grill is held substantially in a vertical position so that the edge where the lugs are located contacts with the edge of the pan where the openings 11 are located. Then by lowering the grill onto the pan the lugs 10 engage in the openings 11. When the grill rests on the pan the hinge connection holds the bars 7 of the grill in proper position with respect to the bars 4 of the pan. This type of connection holds the pan and the grill firmly and securely together while the broiler is being used and yet the grill may be readily and quickly separated from the pan to facilitate cleaning. When the lugs 10 are in engagement with the openings 11 the parts operate like a hinge permitting the grill to be swung to and from its position on top of the pan.

When the broiler is in use the heat from the stove passes upwardly through the openings or slots between the bars 4 of the pan and then through the openings or slots between the bars 7 of the grill, as indicated by the arrows in Fig. 4. The passage of the heat to the material on the grill is therefore not obstructed but the juices passing downwardly from the material on the grill run down the inclined faces of the bars 7 of the grill then through the openings between these bars where they are caught by the V-shaped grooves in the bars 4 of the pan and are conducted outwardly to the collecting trough 5. When it is desired to pour the juices out of the trough 5 the entire pan, together with the grill, is lifted by means of the handle 8 and the juices are poured out of the trough through the spout 9. During this operation the detachable connection between the grill and the pan holds the grill firmly and securely to the pan so that there is no danger of the grill becoming detached.

The broiler may be made out of cast metal if desired but preferably it is stamped from steel and plated with some material such as nickel.

The broiler is inexpensive to manufacture as all the parts, except the handle 8, may be stamped from sheet metal. The grill with its bars 7 may comprise one metal stamping and the pan 1 with its bars 4 may comprise a single stamping. There are, therefore, only two main parts to the broiler. The lugs 10 are shown in the drawing as being formed on a plate which is riveted to the grill but even these may be formed integrally with the grill if so desired.

In a cooking utensil of this character the ease of handling it without the members becoming separated and falling apart, and its capability of being readily taken apart for cleaning are important considerations as such things determine to a large extent whether or not the utensil will meet with the approval of the user. The detachable connection herein disclosed was designed to provide these advantages and also to keep the bars of the grill in proper position with respect to the bars of the pan, without materially increasing the cost of manufacture of the broiler and without taking it out of the class of inexpensive cooking devices.

I claim:

1. A broiler comprising a pan having a series of transversely extending spaced bars whose upper surfaces form juice-catching grooves, a grill on said pan having a series of transversely extending spaced bars arranged substantially parallel with said first named bars to support the material to be broiled, the bars on the pan lying under the openings between the bars on the grill, and a hinge connection between the grill and the pan comprising a horizontal element associated with one of the parts of the broiler about whose axis the hinge operates and a receiving portion for said element associated with the other part of the broiler, said horizontal element and said receiving portion serving to hold the bars on the grill in proper relation to the bars on the pan and serving to hold the grill in position on the pan when the broiler is in use but being separable to permit intentional separation of the grill from the pan.

2. A broiler comprising a pan having a series of transversely extending spaced bars whose upper surfaces form juice-catching grooves, a grill on said pan having a series of transversely extending spaced bars arranged substantially parallel with said first named bars to support the material to be broiled, the bars on the pan lying under the openings between the bars on the grill, the grill having a pair of hook-shaped lugs and the pan having a pair of openings near one of its upper edges to form horizontal elements above them adapted to be received by said lugs to form a quick detachable hinge-like connection between the grill and the pan, said lugs and said horizontal elements being adapted to hold the bars on the grill in proper relation to the bars on the pan.

3. A broiler comprising a pan having a series of transversely extending spaced bars whose upper surfaces form juice-catching grooves, a grill on said pan having a series of transversely extending spaced bars arranged substantially parallel with said first named bars to support the material to be broiled, the bars on the pan lying under the openings between the bars on the grill, and two hinge connections between the grill and the pan both located at one side of the broiler and having a common axis about which the grill may be swung in a single plane, said hinge connections being adapted to hold the bars on the grill in proper relation to the bars on the pan and to hold the grill in position on the pan when the broiler is in use but being detachable to permit intentional separation of the grill from the pan.

HARRIS V. HARTMAN.